United States Patent
Barnett et al.

(10) Patent No.: US 7,337,388 B2
(45) Date of Patent: Feb. 26, 2008

(54) TOOL-BASED ITERATIVE DOCUMENT MANAGEMENT

(75) Inventors: Michael Barnett, Seattle, WA (US); Jacqueline Lynette Reid, Carnation, WA (US); Margus Veanes, Bellevue, WA (US); Lev Borisovich Nachmanson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 349 days.

(21) Appl. No.: 10/336,222

(22) Filed: Jan. 2, 2003

(65) Prior Publication Data

US 2004/0133858 A1    Jul. 8, 2004

(51) Int. Cl.
G06F 15/00    (2006.01)
G06F 17/00    (2006.01)
G06F 12/00    (2006.01)
G06F 17/30    (2006.01)

(52) U.S. Cl. .................. 715/511; 715/530; 707/203
(58) Field of Classification Search ................ 715/530, 715/511; 707/203
See application file for complete search history.

(56) References Cited

U.S. PATENT DOCUMENTS

| | | | | |
|---|---|---|---|---|
| 4,558,413 A | * | 12/1985 | Schmidt et al. | 707/203 |
| 4,809,170 A | * | 2/1989 | Leblang et al. | 717/122 |
| 4,912,637 A | * | 3/1990 | Sheedy et al. | 707/203 |
| 5,278,979 A | * | 1/1994 | Foster et al. | 707/203 |
| 5,574,898 A | * | 11/1996 | Leblang et al. | 707/1 |
| 5,862,386 A | * | 1/1999 | Joseph et al. | 717/170 |
| 6,360,236 B1 | * | 3/2002 | Khan et al. | 715/526 |
| 6,760,840 B1 | * | 7/2004 | Shimbo et al. | 713/165 |
| 6,766,334 B1 | * | 7/2004 | Kaler et al. | 707/203 |
| 6,772,165 B2 | * | 8/2004 | O'Carroll | 707/101 |
| 2002/0029218 A1 | * | 3/2002 | Bentley et al. | 707/100 |
| 2002/0041605 A1 | * | 4/2002 | Benussi et al. | 370/467 |
| 2004/0103393 A1 | * | 5/2004 | Reddy et al. | 717/122 |
| 2004/0205539 A1 | * | 10/2004 | Mak et al. | 715/511 |

OTHER PUBLICATIONS

Munson, Jonathan P., et al., "A Flexible Object Merging Framework", CSCW '94, Chapel Hill, NC, Oct. 1994, pp. 231-242 [ACM 0-89791-689-1/94/0010].*

(Continued)

Primary Examiner—Shahid Alam
Assistant Examiner—Robert Stevens
(74) Attorney, Agent, or Firm—Klarquist Sparkman, LLP

(57) ABSTRACT

A change management method and system for tool-based document generation which incorporates tool input changes, tool changes, and user changes during iterative document creation. After a tool-based document is generated and saved by a tool, and then edited by a user, during a next iteration of creating the edited document, the tool first generates a new base document. The base document is then saved, and a three-way merge is performed on the former iteration's base document, this iteration's new base document, and the former iteration's edited document. The former iteration's base document serves as the base of the merge process. The merge outputs a merged document, and when further edits are needed, the merged document is edited, and saved as the edited document. If no edits are necessary, the merged document is saved directly as the edited document. In each iteration, the new base document and the edited document are saved for a possible next iteration.

22 Claims, 16 Drawing Sheets

OTHER PUBLICATIONS

Mei, Hong, et al., "A Software Configuration Management Model for Supporting Component-Based Software Development", ACM SIGSOFT Software Engineering Notes, vol. 26 No. 2, Mar. 2001, pp. 53-58.*

Conradi, Reidar, et al., "Version Models for Software Configuration Management", ACM Computing Surveys, vol. 30 No. 2, Jun. 1998, pp. 232-282.*

Rubin, Charles, Running Microsoft Word 2000, Microsoft Press, Redmond, WA, © 1999, pp. 3-5, 19-22, 260-263 and 837-843.*

Yang, Wuu, et al., "A Program Integration Algorithm That Accommodates Semantics-Preserving Transformations", ACM Transactions on Software Engineering and Methodology, vol. 1 No. 3, Jul. 1992, pp. 310-354.*

Horwitz, Susan, et al., "Integrating Non-Interfering Versions of Programs", ACM Transactions on Software Engineering and Methodology, vol. 11 No. 3, Jul. 1989, pp. 345-387.*

Flores, Ivan, "Analysis of Internal Computer Sorting", Journal of the ACM (JACM), vol. 8 Issue 1, Jan. 1961, pp. 41-80 (plus citation page).*

Ayers, Larry, "Product Review: Visual SlickEdit: A Commercial Editor for Programmers", Linux Journal, vol. 8 Issue 1, Apr. 1998, pp. 1-5 (plus citation page).*

Larkey, Leah S., et al., "Collection Selection and Results Merging with Topically Organized US Patents and TREC Data", CIKM 2000, McLean, VA, © 2000, pp. 282-289.*

Lippe, Ernst, et al., "Operation-Based Merging", Proceedings of the Fifth ACM SIGSOFT Symposium on Software Development Environments SDE 5, vol. 17, Issue 5, Nov. 1992, pp. 78-87.*

Rubin, Charles, Running Microsoft Word 2000, Microsoft Press, Redmond, WA, © 1999, pp. 249-263.*

"Overview of Araxis Merge v6.0 for Windows", [Home -> Araxis Merge], http://www.araxis.com/merge/index.html, updated Sep. 25, 2002, 2 pages.

"Feature Summary", [Home -> Araxis Merge -> Feature Summary], http://www.araxis.com/merge/topic_features.html, updated Aug. 5, 2002, 5 pages.

"Three-Way File Comparisons", [Home -> Araxis Merge -> Full Documentation -> Topic], http://www.araxis.com/merge/topic_threeway_file_comparisons.html, updated Sep. 25, 2002, 2 pages.

"Automatic Merging", [Home -> Araxis Merge -> Full Documentation -> Topic], http://www.araxis.com/merge/topic_automaticmerging.html, updated Sep. 25, 2002, 3 pages.

"Editing Files", [Home -> Araxis Merge -> Full Documentation -> Topic], http://www.araxis.com/merge/topic_editing_files.html; updated Sep. 25, 2002, 1 page.

"Merging Files", [Home -> Araxis Merge -> Full Documentation -> Topic], http://www.araxis.com/merge/topic_merging_files.html, updated Sep. 25, 2002, 2 pages.

"Araxis Merge 2001 Documentation Contents", [Home -> Araxis Merge -> Full Documentation], http://www.araxis.com/merge/contents.html, updated Sep. 25, 2002, 3 pages.

"Cvs Conflict Editor", http://gaiacrtn.free.fr/cce/index.html, updated Jun. 19, 2001, 3 pages.

"Programmers' Canvas", updated Aug. 7, 2002, 14 pages.

* cited by examiner

FIG. 7 (PRIOR ART)

```
                                                        ⎯702
#INCLUDE <IOSTREAM.H>

//USER_TAG_1_START

#INCLUDE <BUFFER.H>   ←—706

//USER_TAG_1_END
                          710
                         ↙                    704
CLASS TESTBUFFER ─ ─ ─ ─ ─ ─ ─ ─ ─⎯
                ┆ INHERITS FROM BUFFERCLASS  ┆
{               └─ ─ ─ ─ ─ ─ ─ ─ ─ ─ ─ ─ ─ ─ ┘
//USER_TAG_2_START

NAME.PRINTF;          ←—708

//USER_TAG_2_END
}
```

TOOL-BASED ITERATIVE DOCUMENT MANAGEMENT

TECHNICAL FIELD

This invention relates to providing a change management method and system for tool-based document creation, which incorporates tool input changes, tool changes, and edit changes, during iterative document creation.

BACKGROUND AND SUMMARY

In creating documents on a computer, there are tasks that are performed over and over again. In such cases, it is desirable to automate the creation of repeated tasks in order to save time. One such way of saving time is using a tool to create the repeated portions of the document.

For example, in Visual Studio 6 by Microsoft, a programmer can define a class method by using a dialog called a Wizard. When a programmer provides information about a method (e.g., name, parameters, return type, visibility), the method declaration is output to a header file and an empty method body with a "TODO" comment is output to another file. Then a programmer implements the method body by writing code in place of the "TODO" comments. However, if a programmer determines that changes need to be made to the method parameters, the programmer would like to use the Wizard to make the changes while preserving the code already written in the method body. However, Visual Studio 6 does not allow it. It only allows the creation of new methods and deletion of existing methods.

Another example is a Test Modeling Toolkit (TMT), by Microsoft, which is a testing tool. TMT allows the generation of general test cases in the form of test models. Once a model is defined, TMT can generate files in a language of choice (C++, C# or script languages) which can be used later to run test cases for the test model. The generated test files must be edited to enable sensible tests.

FIG. 1 is an example of a conventional tool that saves time in document creation. A tool 102 is a program that receives a tool input 104, and outputs a tool generated document 106. The tool input may be from templates, files, or other input resources. Often, the tool input includes content that is reused, so time is saved during document creation. The tool generated document 106 may include content from the tool input 104, along with other content as configured by the tool 102, based on user 112 input to the tool through a user interface (e.g., a graphical user interface, or GUI). A few examples of such conventional tools are wizards for developing or testing computer programs, and wizards for creating text documents, spreadsheet documents, or presentation documents.

Since the tool automates portions of the document, other portions of the document may require additional content or changes. Using an editor 108, and the tool created document as input 106, a user 112 creates an edited document 110. The editor 108 may be part of the tool 102, or may be a separate program.

FIG. 2 is an example of a tool input 202, a tool generated document 204, and an edited document 206 showing a conventional scenario of content progression. In the conventional scenario, a tool allows the user to automate content selection, arrangement, and configuration (i.e., configuration), thereby creating a tool generated document containing tool configured content 204 (i.e., a base document). From this base document 204, a user 112 (using the editor 108) edits and/or adds content to the base document 106 to create an edited document 206.

For example, given the context of the document being generated as configured by a tool user, there is much content that the tool knows how to configure and generate. For example, a tool that automates writing business letters generates content from a template such as a company letterhead and logo. Content may also be selected for the letter body (repeat forms or paragraphs selectable from a template(s) by a user using a tool menu or GUI). The tool generates other content such as the date or addressee. In another example, the tool is a program developer's tool, and from a selected language type (e.g., C++, Pascal) the tool generates a file, a file header, or many files that are required to compile a program. For example, a generated content such as a program header may contain references to class libraries which support the program. The tool may also generate a number of method signatures in order to define input-output parameters for identifying and controlling program module interactions. This process creates a boilerplate of code which includes sections that are filled-in by a user, such as the code within the method body. In the case of automated program development, or automated test code generation, a tool input also includes information that is of no real user interest, but is required to make the program or code usable by the computer. The uses for such conventional tools are diverse and well known.

FIG. 3 is a simplified pseudo-code example of a one-way-trip for content progression for a conventional tool generating test cases for testing a program. In one such conventional example, a user 112 is a program tester, who is generating code to test a program. In this example, using a GUI associated with the tool 102, a user 112 configures a document 306 to be C++ source code for testing the results of a buffer overrun, and then adds code to the test body to create an edited document 312. So the resulting code 110 is a test case for testing a computer program. In this example, based on the C++ source code configuration by the user, the tool 102 inserts header information from a tool input 302 into a tool generated document 306.

Further, a user may select content 304 used for testing, or content 304 may be forced by the tool input 302 or tool, into the tool generated document 306 as shown 308. In this example, a test method called "TestBuffer( )" 304 is inserted into the tool generated document 306. In this case, the tool 102, with the possible help from a user 112 through a tool GUI, configures the TestBuffer 302 parameter to include a string 310 parameter. In this one-way-trip example, after the tool generated document is complete 306, a test developer 112 uses the editor 108, to create an edited document 312. In this case, the test developer adds test code for overloading a buffer and writing any error code to a test file 314. In this conventional one-way-trip example, once the tool generated document is created 306 and edited 108 by the user 112 to create an edited document 312, the process is complete. A test developer then compiles the document 312, and runs the test case(s).

As shown in FIG. 4, using this conventional one-way-trip process, if the tool or the tool input adds content or configures content, a problem occurs. In this case, a tool input 406 adds and requires a new method called "GetBufferSize( )" 402, and the tool adds a parameter to this new method 404. The problem occurs because the tool input has no knowledge of the pseudo-code 314 added by the user in the previous iteration 312. Using this one-way-trip process, the tool and tool input are unable to incorporate prior work done by the user with the editor 314, 108. Thus, in this conventional system, a user would manually cut and paste the content 314 from the previously edited document 312 into the new document 408 as shown 410. In some cases, several iterations of changed tool input's and tool configuration's require a user 112 to use the editor 108, to cut and paste additions or edits into each new generation 408 before desired testing was complete.

As shown in FIG. 5, a conventional round-trip-user-tag method was developed to eliminate redundant user cutting and pasting. The conventional round-trip-user-tag method works the same as the one-way-trip model, with two additions. First, the tool input 502 inserts user tags into the tool generated document 506. The user tags indicate where users are able to edit the document 508. Second, when the tool 504 or the tool input 502 was later changed thus requiring regeneration as previously discussed, the edited document with user tags 508, served as input to the tool 510. Thus, when changes were made to the tool or tool input, thereby requiring regeneration, those changes would serve as input to the tool and used to create next generation tool generated document 506. However, the content added by the user within the user tags in the previous iteration 508, was also fed back into the tool as input, and inserted in the next generation tool generated document 506. This created a way that the tool would cut and paste content from prior user edits, so it no longer had to be done manually as previously discussed.

As shown in FIG. 6, under the conventional round-trip-user-tag method, a tool input 602, or a tool 504 would contain content 606, 604, that controlled where within the content a user could edit the content. Once the tool generated document with user tags 506, 608 was created, a user could use the editor 512 to create an edited document with user tags 508, 610. In this example, the user adds content between unique tags 612, 614 which are identifiable in the tool input in a one-to-one relationship. The benefit of this conventional round-trip-user-tag with one-to-one correspondence with the tool input, is that when the user edited document is later received as input to the tool during regeneration 510, the tool knows where user edited content needed to be pasted into the next generation tool generated document with user tags 506. This conventional round-trip-user-tag adaptation of the one-way-trip method saved time because users were no longer required to cut and paste prior edits into the next generation. Although round-tripping with user tags is an improvement over one way generation with cut-and-paste, significant limitations became apparent.

For example, edits made by a user outside the user-tags were ignored by the tool and lost in regeneration. Further, the tool and tool input introduced significantly more user-tags (and clutter) into the base document than were used in the edited document. No matter how many tags were added to the tool input, there are always edits that a user can make outside of the tags's scopes. These changes would be ignored by the tool during regeneration. So the method was both over-inclusive and under-inclusive.

As shown in FIG. 7, a tool generated document with user tags 702 is shown with an example edited document content 704 that that will be ignored during a regeneration 510. If content is inside the tags 706, 708, it is carried to a next generation, if it is not inside the tags 704 it is ignored by the tool during regeneration. In this example, a user has attempted to make a class "TestBuffer( )" 710 inherit from another class called "BufferClass" 704. This user's edits 704 were ignored during regeneration 5 10.

The problem with this conventional roundtrip-user-tag solution is that a decision needs to be made in advance about what content can be edited or added by the user, and what content is controlled by the tool. If content is within the user-tags, it is controlled by the user, otherwise, it is controlled by the tool. This creates content conflicts that can not be resolved. For example, when an inheritance descriptor is outside the user tags, changes made by the user to the inheritance class are ignored under this conventional model. This required the user to go back into the regenerated document, and manually change the inheritance each time the document was regenerated. Further, if the inheritance descriptor is placed inside the user tag, then the tool input does not control it, and any user edited or changed code was put in its place upon document regeneration. So in this conventional scenario, a decision was made in advance about what could be changed by a user and what content could be changed by the tool. Further, user tags were guarding the user code 706, 708, and the number of user tags must remain constant since they are tool controlled. Thus, tags could not be added by a user, since upon regenerations, the tool using the tool input, would not "know" what to do with user generated tags since there was a tool input controlled one-to-one relationship between tags in the tool input to tags in the base document. Users could only type within the user tags, and the tool would pull this user code into the base document, verbatim, between the tags as organized and controlled by the tool input. Each user tag was unique and it had to directly match the location in the tool input. The user had no ability to name a tag and add extra information. Tool inputs typically had extra tags which were often not required by the users, for example, tags for extra class information, tags for extra file information, and other tags where a user may want to insert user code. Upon regeneration, any user edits outside the tags were just ignored, because the tool didn't know where to place the code upon regeneration.

This is a general computer problem that is encountered many times over and over because there are many tools that begin with a tool input, fill in some information, and then generate a document. This method works fine when you just create the document once, but the problem occurs when you later attempt to regenerate the document with two points of modification, one at the tool input, and the other the edited document. Again, the first conventional solution just prohibits regeneration of the document (i.e., round-tripping). The other conventional solution allows round-tripping, but limits user freedom by pulling in only code within user tags.

The tool inputs can be created by anyone not excluding the tool creator or users. However, in many document environments this becomes a problem because tool inputs need to remain general in nature, while iterations of development become more specific. In order to control a document environment (e.g., office documents, test development programs, or program development), the tool input and/or tool can often only be changed by an authorized party. Consider as an example, that another method is added to the tool input that a test-template creator wants everyone to use. This is a way for an authorized party to provide or require a new method, for test-developers to use. Since a tool input is general in nature, users developing a specific iteration should not be allowed to alter a generalized tool input.

When a tool is changed, the resulting generated output is changed. Any documents generated by the tool before the tool changed will need to be regenerated in order to incorporate the changes. Further, when the document is regenerated with the changed tool, a user may need to edit or add content in order to complete the user customization portion of the changes. For example, if a new method signature is forced by the tool into a portion of the generated document, then the user may need to write code for the new method. Documents are often regenerated to introduce new content and configuration when a program or a program test is under development. For the same reasons, when the tool inputs are changed to include new content, the documents need to be regenerated to incorporate these changes. For example, in developing test cases, a tool input is used to expose additional methods to test developers. So when changes are made to the underlying framework that functionality is exposed to test developers through a changed tool input. The conventional round-trip-user-tag method is unable to handle simultaneous changes from multiple sources.

Changes made to a tool input are generally changes that are general in nature and will apply across many documents. Changes made to how a tool generates a document or a specific document's content are often more specific and related to a specific document being generated. However, changes made to a tool can also be general in nature and changes made to a tool can also be a new version of the tool (e.g., version 1.0 becomes version 1.2) Changes made to a tool may generate a series of menus that need to be responded to and may involve user interaction during regeneration. Changes made to tool inputs and tools are known and require significant user interaction (i.e., cutting and pasting); no system has been developed to remove these inefficiencies.

For example, in the conventional round-trip-user-tag solution a tool may have changed a parameter 616 in a method (possibly through user interaction) during configuration. In a subsequent regeneration 510, since this tool change created a signature 616 not recognizable in the tool input, a subsequent regeneration 510, of the tool generated document with user tags 506, would include a copy of both methods. The user then needed to cut and paste to return to a desired state.

The present technology is directed towards providing a change management method and system for tool-based document regeneration which incorporates tool input changes, tool changes, and user changes during iterative document creation without the use of user-tags. After a tool-based document is generated and saved by a tool, and then edited by a user, during a next iteration of creating the edited document, the tool first generates a new base document. The base document is then saved, and a three way merge is performed on the former iteration's base document, this iteration's new base document, and the former iteration's edited document. The former iteration's base document serves as the base of the merge process. The merge outputs a merged document, and when further edits are needed, the merged document is edited and saved as the edited document. If no edits are necessary, the merged document is saved directly as the edited document. In another respect, in each iteration a new base document and an edited document are saved for a possible next iteration.

Additional features and advantages will be made apparent from the following detailed description of the illustrated embodiment which proceeds with reference to the accompanying drawings.

BRIEF DESCRIPTION OF THE DRAWINGS

FIG. 7 is a diagram of a conventional edited document with user tags and ignored edits.

DETAILED DESCRIPTION

In the following detailed description, one implementation of a solution for the tool-based iterative document creation is discussed with the following associated drawings.

Figure 1:
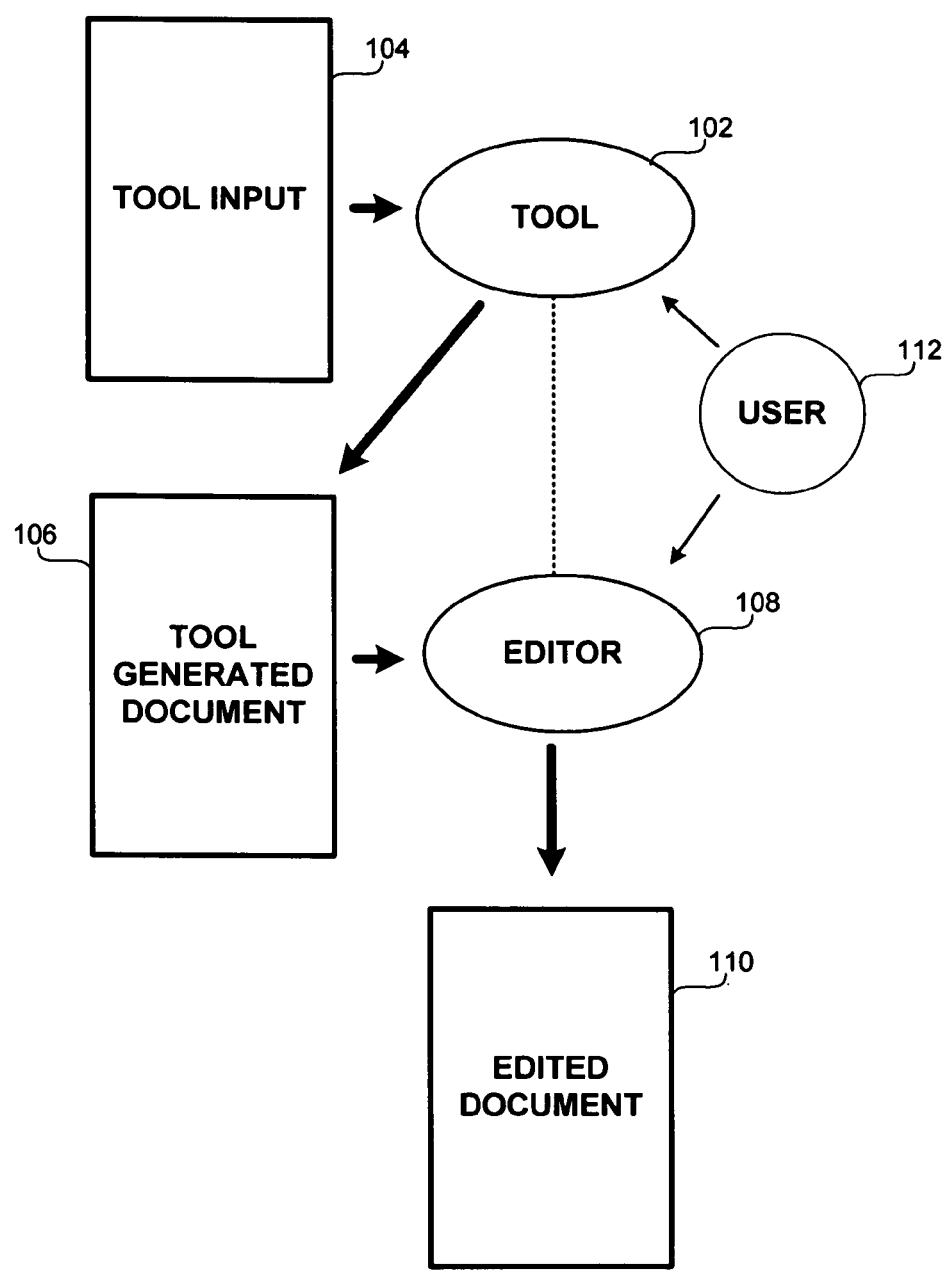
FIG. 1 is a diagram of a conventional system of one-way tool-based document creation.
Figure 2:
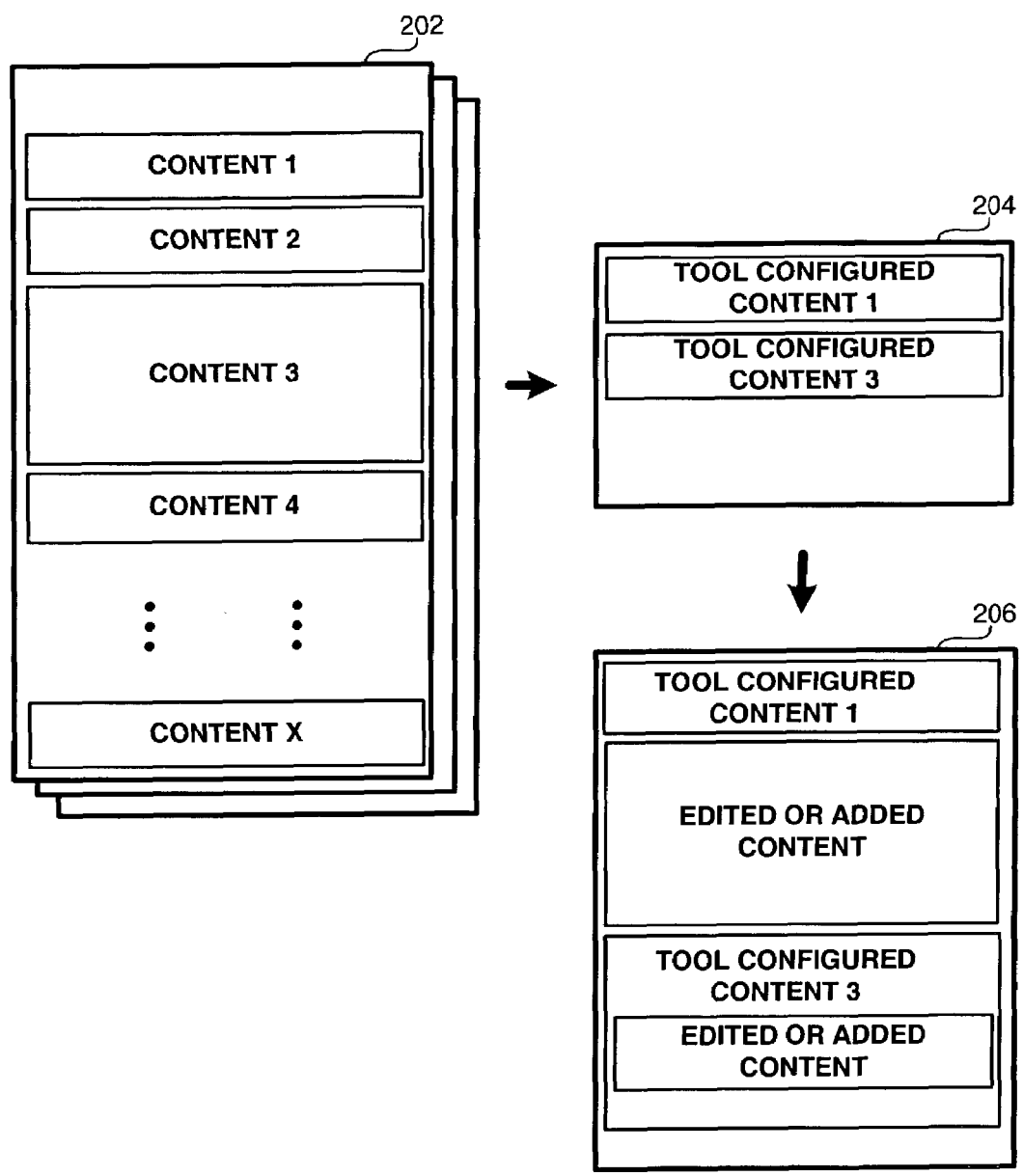
FIG. 2 is a diagram of a conventional tool input, base document, and edited document.
Figure 3:
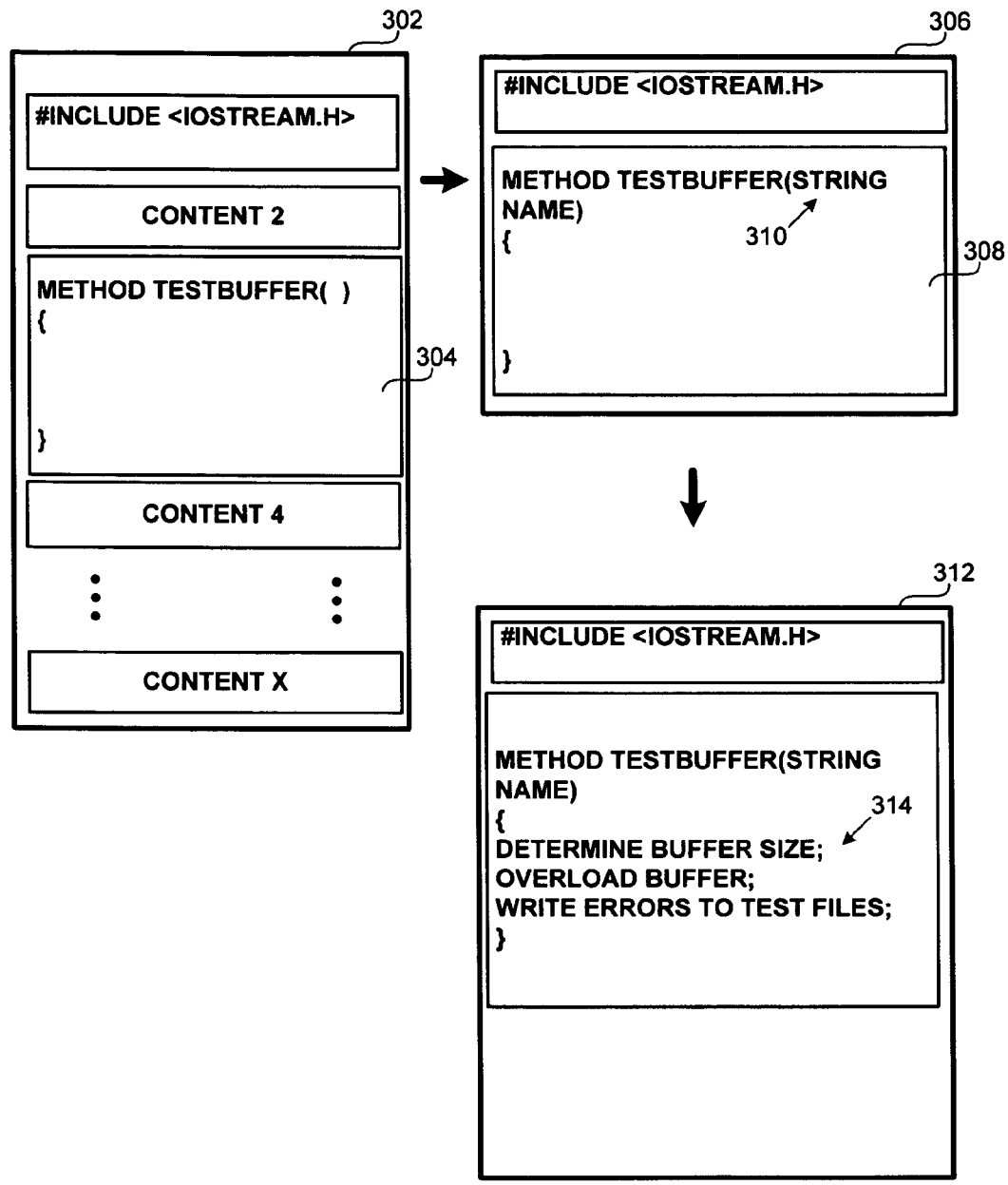
FIG. 3 is a diagram of a content specific example of FIG. 2.
Figure 4:
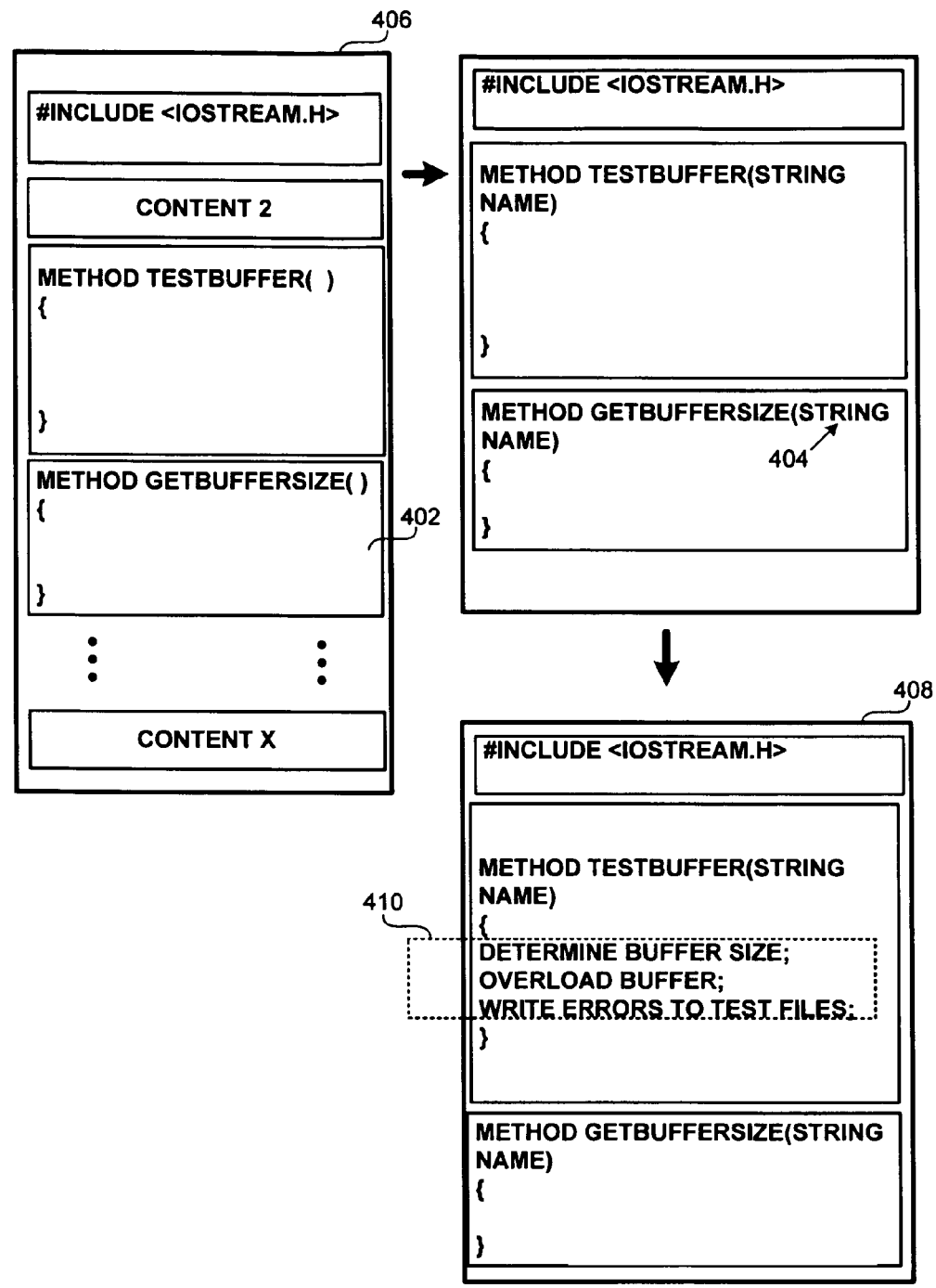
FIG. 4 is a diagram showing a conventional one-way tool-based document creation with cut and paste.
Figure 5:
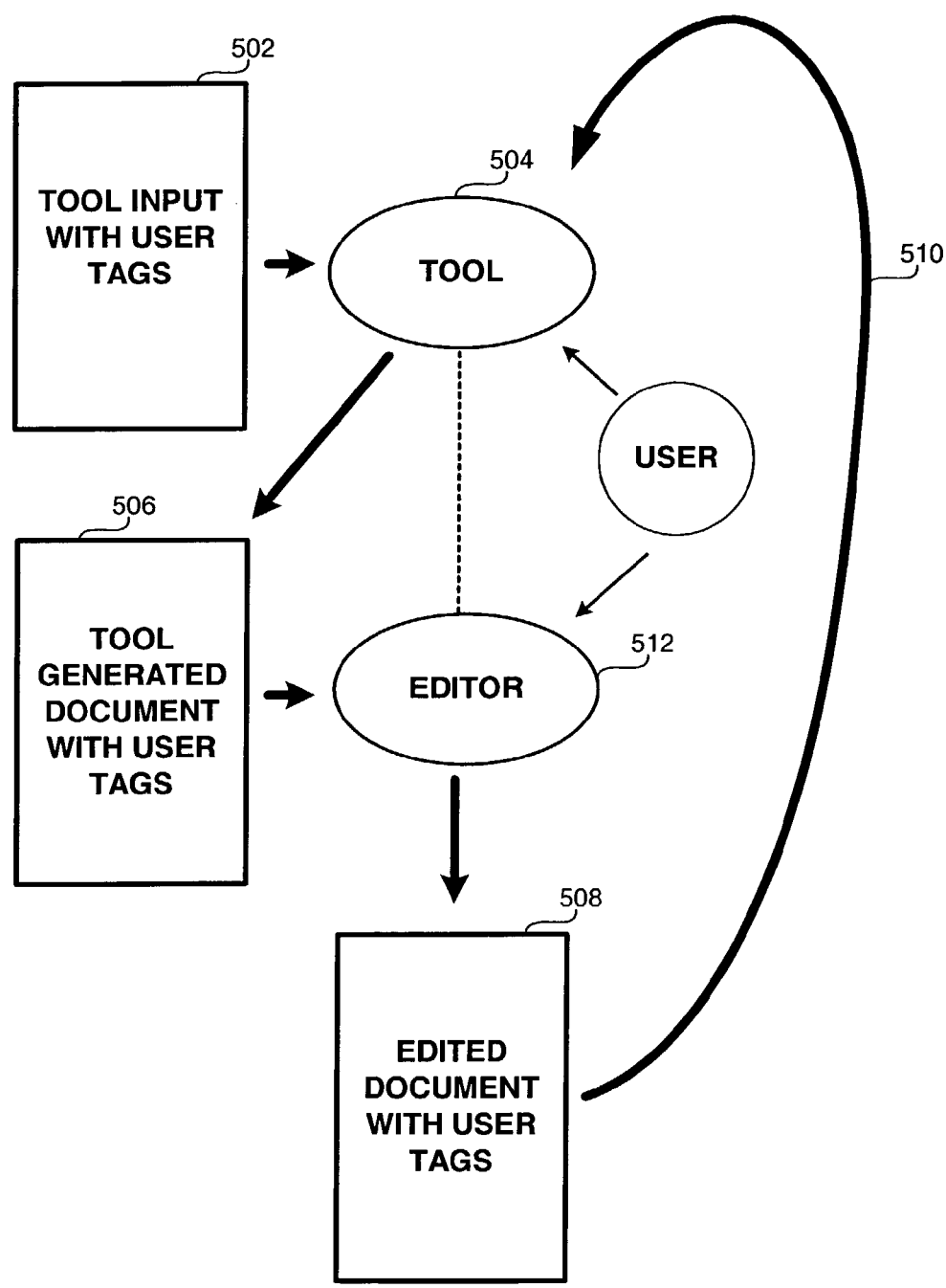
FIG. 5 is a diagram of a conventional round-trip tool-based document system with user-tags.
Figure 6:
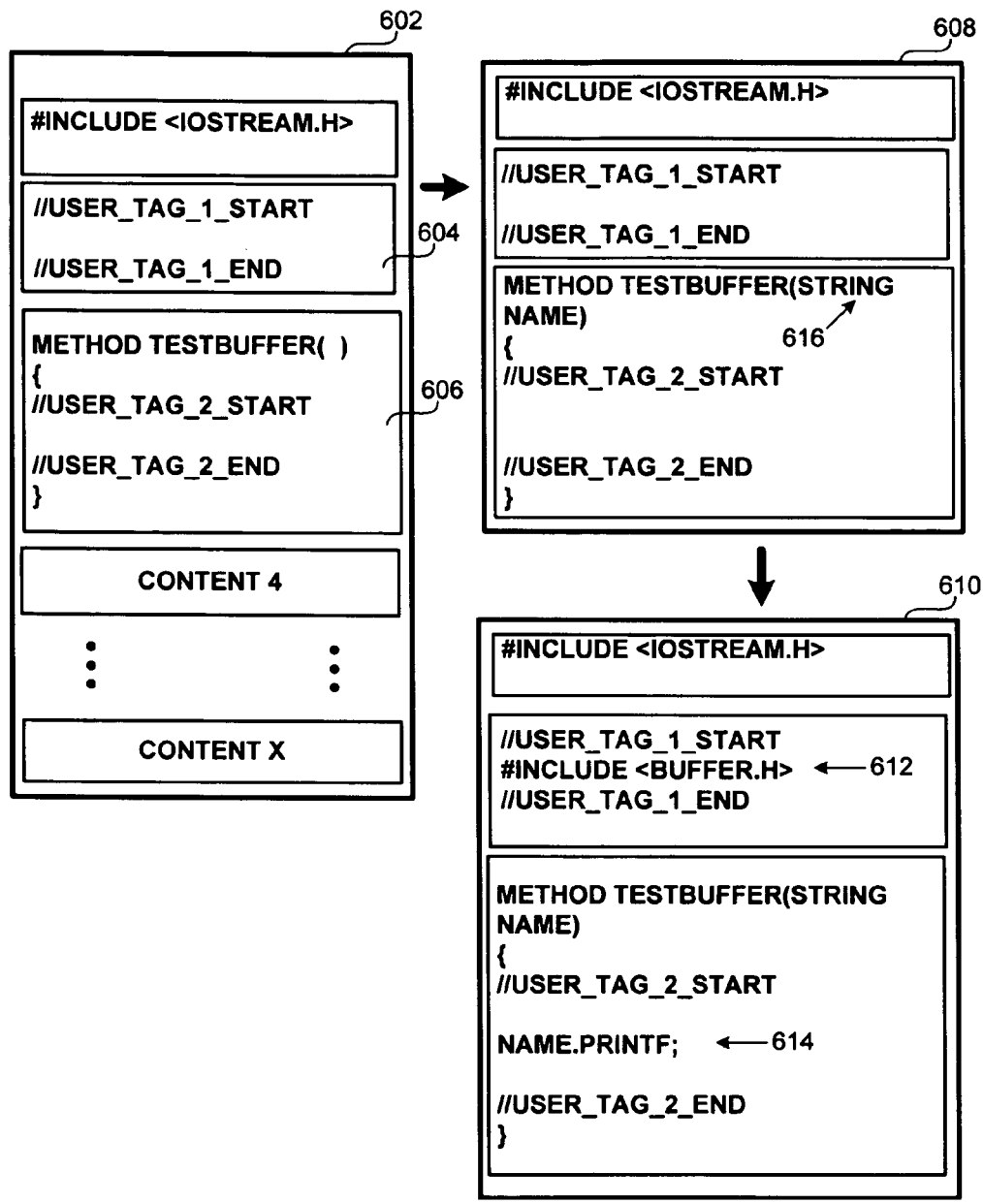
FIG. 6 is a diagram of an example conventional tool input, base document, and edited document with user tags.
Figure 8:
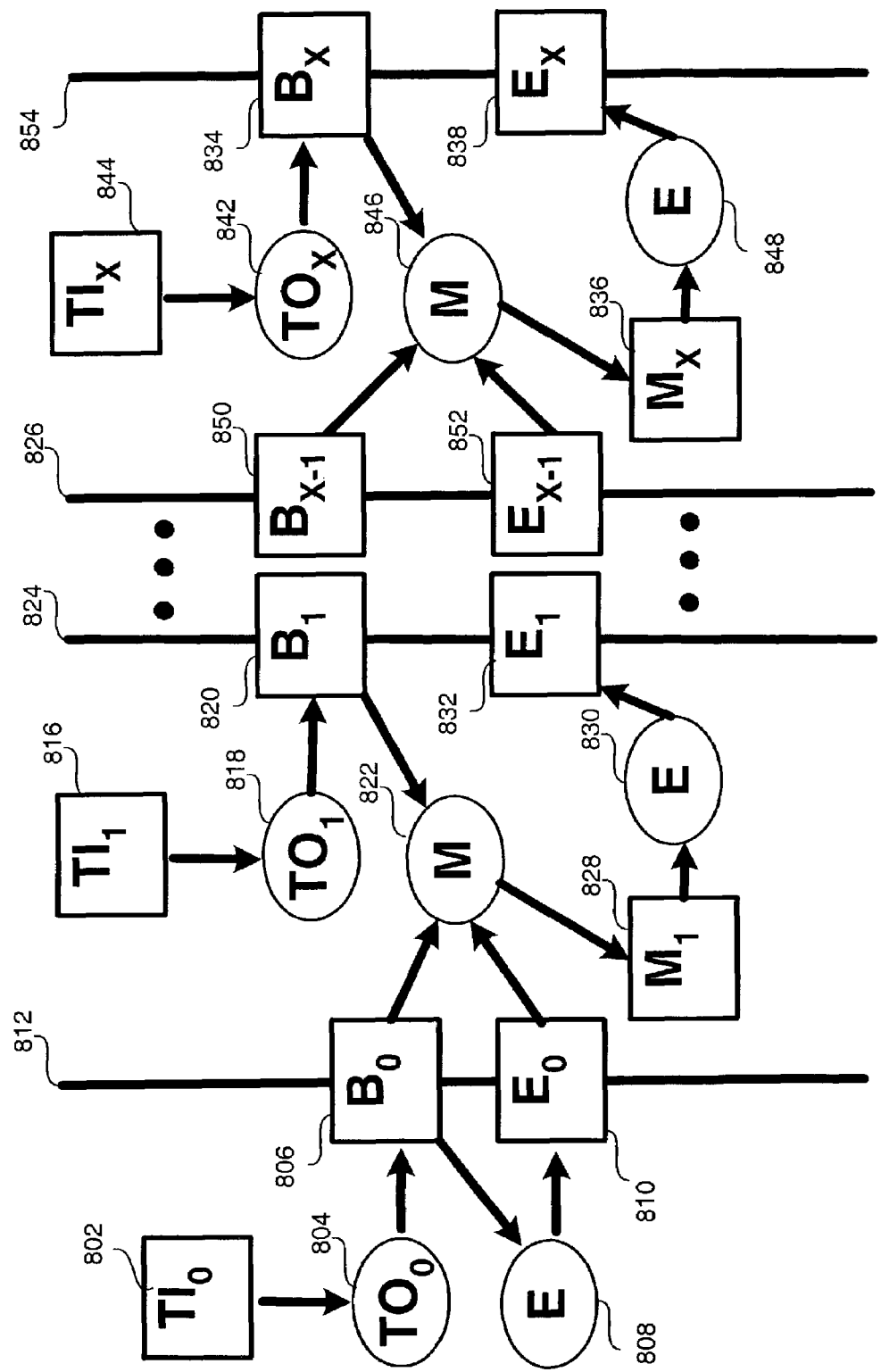
FIG. 8 is a diagram of an iterative tool-based document management method and system.

As shown in FIG. 8, during a first iteration, a tool input 802 serves as input to the tool 804. The tool input 802 and the tool 804 have a present state (I=0) for this iteration. The present state implies a tool input state and a tool state. A tool input may change over time from one iteration to the next, though a tool input change is not required between iterations. A tool may change over time from one iteration to the next, though a tool change is not required between iterations. The output of the tool and tool input in this state (I=0) is a base document 806. The base document 806 is input to an editor 808, and the output from the editor is an edited document 810. A user provides (e.g., through a GUI) configuration directives to the tool 804, and editorial input to the editor 808. The vertical bar represents a state of saved documents 812, 824, 826, between iterations of document generations (e.g., I=1, 2, . . . X). For example, a copy of the unedited base document 806 as created by the tool is saved, along with a copy of the edited document 810.

Later, in a next iteration (I=1) 814, when a user selects a document they were working on 810, a process of regeneration occurs which manages changes in the tool input 816 or tool 818 from the previous iteration. The process also manages changes in the tool 818 from one iteration to the next, and incorporates the user edits 810 made during the previous iteration.

During a next iteration of document creation (e.g., I=1), the tool 818 first generates a new base document 820. The base document is then saved 824. Next, a three way merge 822 is performed on the former iteration's base document 806, this iteration's base document 820, and the former iteration's edited document 810. The merge 822 outputs a merged document 828. If further edits are needed, the merged document 828 is edited 830, and the edited document is saved 832. If no edits are necessary, the merged document 828 is saved in place 824 of the edited document 832. As shown, three documents 806, 820, 810 serve as input to the merge 822, during the iteration (i.e., I=1), and a merged document 828 is the output. In the first iteration, the base document 806 was edited, in the second and subsequent iterations, the base document is saved 820, 834, and if edits are necessary, the merged document 828, 836 is edited. The base document (e.g., 806, 820, 850, 834) and the edited document 810, 832, 852, 838, are saved 812, 824, 826, 854, for a next iteration. During the first iteration (I=0) of a base document, there exists no prior base document or user edited document to serve as input to the tool 804. However, for each subsequent iteration from (i.e., I=1, . . . I=X−1, I=X), an unedited base document, and an edited document are saved for the next iteration 812, 824, 826, 854. As shown in FIG. 8, the tool 818, the merge 822, and the editor 830, are separate computer programs or processes. However, any two (i.e., tool and merge, merge and editor, or tool and editor) may be integrated into one computer program (e.g., FIG. 9), or all three may be integrated into one computer program (e.g., FIG. 10).

A general solution reduces to a set of inputs to the tool for a next document generation. As shown for a general iteration 840 (i.e., I=X), a tool$_x$ 842 (i.e., TO$_x$) receives as input a tool input$_x$ 844 (i.e., TI$_x$), and outputs a base document$_x$ 834 (i.e., B$_x$), which is saved 854. A merge 846, receives as input, a base document$_{x-1}$ 850 (i.e., B$_{x-1}$) and an edited document$_{x-1}$ 852 (i.e., E$_{x-1}$) from the prior iteration, and a base document$_x$ 834 from this iteration. The merge 846 then generates a merge document$_x$ 836 (i.e., M$_x$) for this iteration, which is input to an editor 848 (if edits are necessary for this iteration), and then saved as an edited document$_x$ 838 (i.e., E$_x$) for a next iteration. If no edits are required on the merged document$_x$ 836, it becomes the saved edited document$_x$ 838.

The described technology is useful in any context where a tool is used to create a document (i.e., a base document), and then the user with an editor or another program modifies or specializes the created document (i.e., an edited document). It is not otherwise limited. In these tool created environments, a tool input can be changed from one iteration to the next, so the new tool output is merged with the prior iteration's base document and edited document. For example, any wizards that create documents from tool inputs in program testing and development environments, and any wizards that create documents from tool inputs in document production systems.

Unlike the conventional solution for round trip document generation, the described technology naturally accounts for and incorporates changes made to or by the tool (i.e., TO$_{X-1}$ to TO$_X$) and changes made to the tool input (i.e., TI$_{X-1}$ to TI$_X$) from one iteration to the next (i.e., X−1 to X). However, the system still works when (1) either no changes are made to the tool input (i.e., TI$_{X-1}$=TI$_X$), or when no changes are made to the tool (i.e., TO$_{X-1}$=TO$_X$) between iterations (i.e., X−1 to X). The system also works when both the tool and tool input are not changed between iterations. In all such cases, the three file merge method incorporates and merges content from the three sources without the limits of user-tags, and without ignoring user content added outside user-tags.

The three file merge method had not been previously used in this tool input or tool generated document context. Nobody realized that the base document from the previous iteration provided valuable information that could be used in a three file merge. The source code management context where the three-file-merge is used taught away from the described arrangement. In that context, the document used for the base in the merge contained all the user edits from the previous iteration. In this case, the base document contains only the tool configuration edits, so nobody thought that the base document from the prior iteration had any value in a three file merge. So in the prior systems the base document$_{x-1}$ 850 from the prior iteration was not used in a three-way merge process. In the conventional system, the edited document$_{x-1}$ 852 from the prior iteration, and the new base document$_x$ 834 were used as input to round-tripping with user tags. By including the base document$_{x-1}$ 850 from a previous iteration in a three-file merge along with the previous edited document$_{x-1}$ 852 and the new base document$_x$ 834, all changes (i.e., to the tool or tool input) are automatically incorporated in a three file merge. Further, user-tags are no longer required, and the system does not ignore user inputs in the document (i.e., outside the user-tags).

A user is not limited to making changes between user tags. User-tags are not a requirement of the present technology, but may be used without disrupting the described technology. Thus, the tool input 844, the base documents 850, 834, and the edited document 836 are not required to have user-tags. The user may freely edit the merged document 836 using the editor 848, thereby creating the edited document 838.

Figure 9:
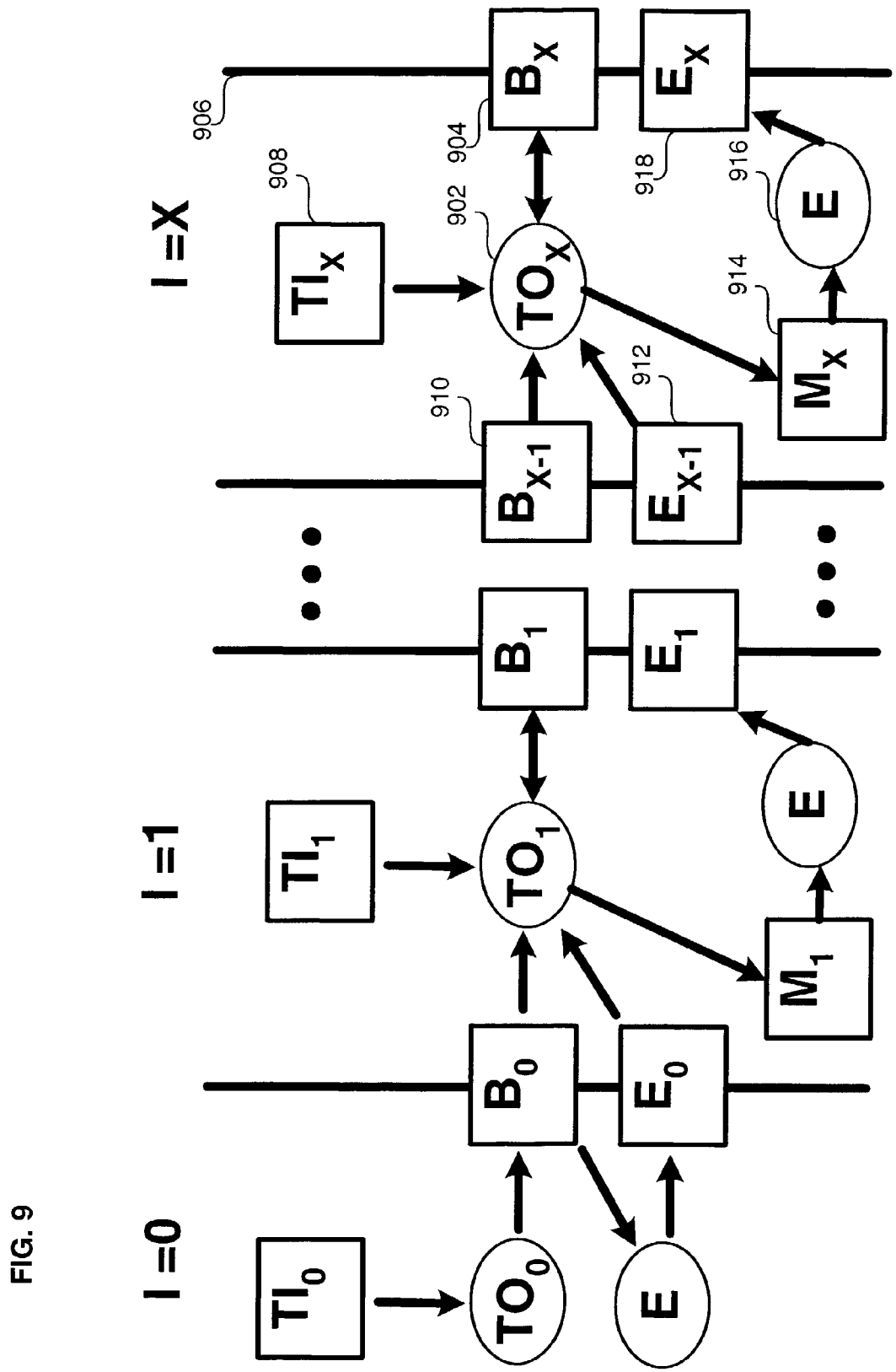
FIG. 9 is a diagram of an iterative tool-based document management method and system.

In another implementation, as shown in FIG. 9, the merge program is integrated into the tool$_x$ 902. In such an implementation, the base documents 904 is created by the tool$_x$ 902 from the tool input$_x$ 908 and saved 906. The merge function in the tool$_x$ 902, receives the base documents 904, the base document$_x$ 910 from the prior iteration, and the edited document$_{x-1}$ 912 from the prior iteration as input, and outputs a merged document 914. In this implementation, the merged document$_x$ 914 is input to a separate editor program 916. After edits are complete, the edited document$_x$ 918 is saved.

Figure 10:
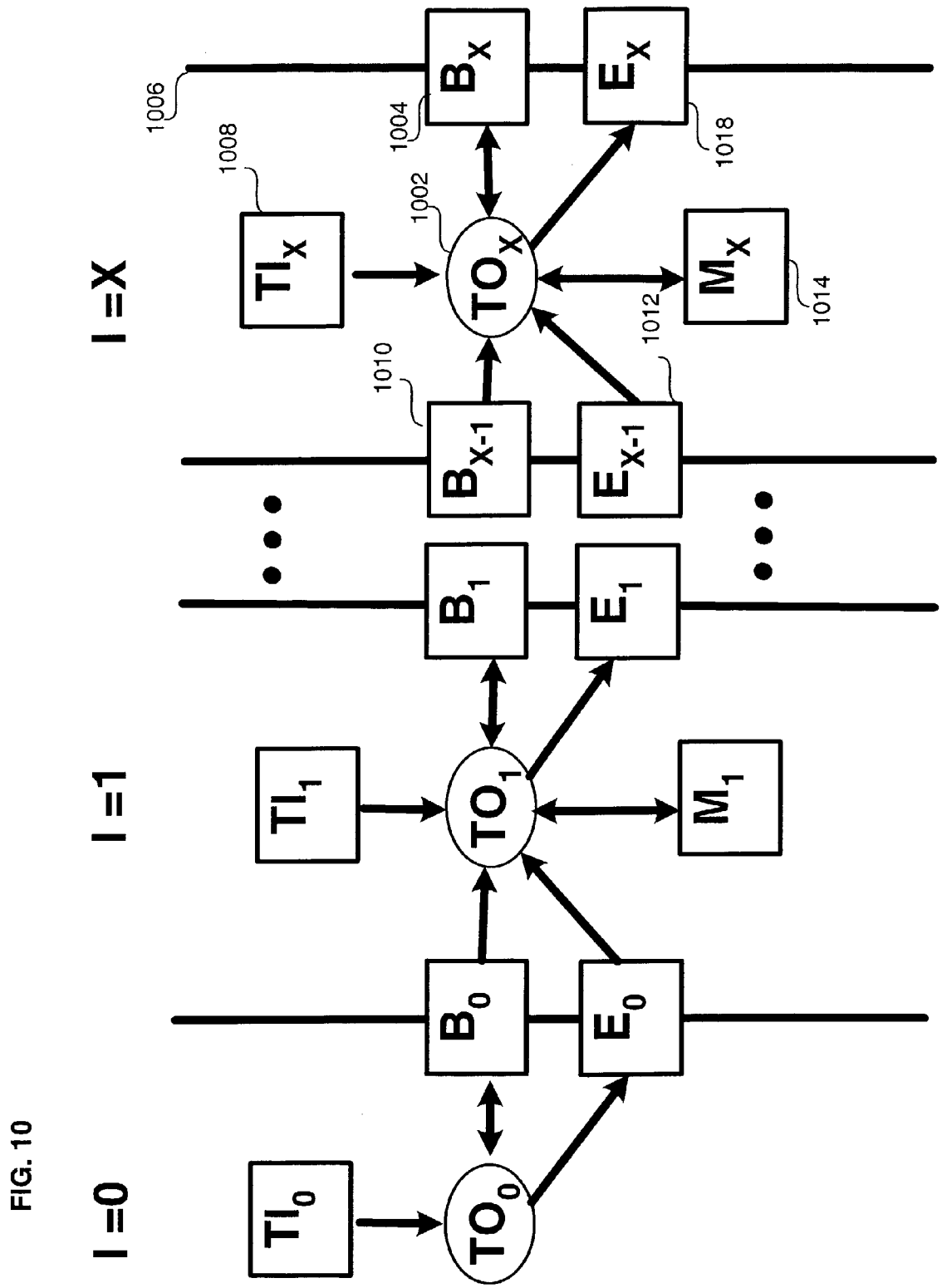
FIG. 10 is a diagram of an iterative tool-based document management method and system.

In another implementation, as shown in FIG. 10, the merge program and the edit program are integrated into the tool$_x$ 1002. In such an implementation, the base document$_x$ 1004 is created by the tool$_x$ 1002 from the tool input$_x$ 1008 and saved 1006. The merge process in the tool$_x$ 1002, receives the base document$_x$ 1004, the base document$_{x-1}$ 1010 from the prior iteration, and the edited document$_{x-1}$ 1012 from the prior iteration as input, and outputs a merged document 1014. In this implementation, if edits are necessary during this iteration, the merged document$_x$ 1014 is edited by an editor function in the tool$_x$ 1002. After edits are complete, the edited document$_x$ 1018 is saved.

It is not the intent of this document to describe the technical nuances of a three-file-merge, since that concept is conventional in nature. What is helpful here is understanding how the three-file-merge is used in this context to manage changing tool inputs and tools in a tool-based generated document environment.

Figure 11:
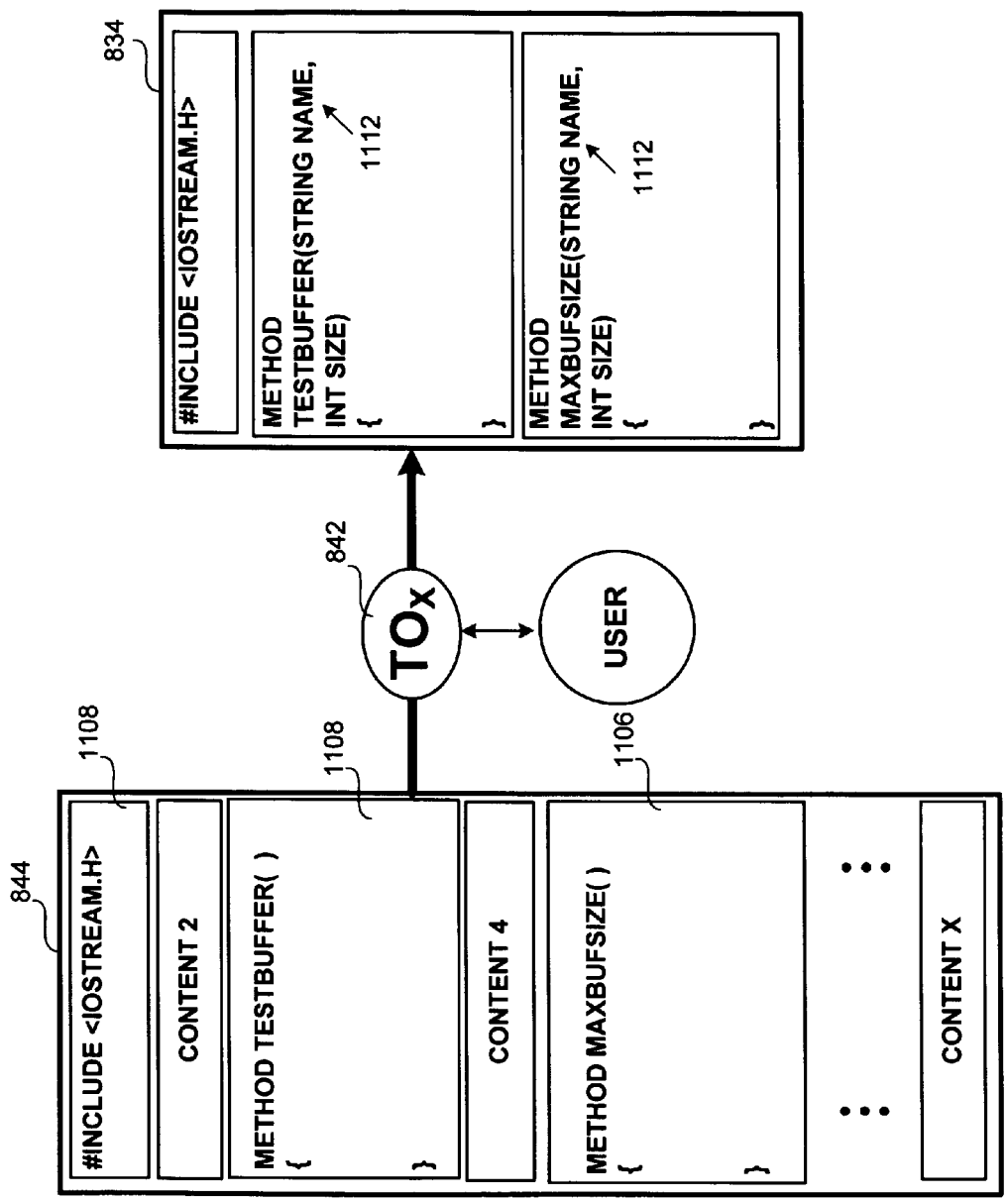
FIG. 11 is a diagram of a system of tool created base documents.

As shown in FIG. 11, a tool input 844 and or a tool 842 may require or introduce change from the previous iteration's base document 850. For this example, the FIG. 8 embodiment with separate tool 842, merge 846, and edit 848 programs or processes is used, but the discussion is trivially adaptable to FIGS. 9 and 10. Assume that the tool 844 or tool input 842 is introducing a change to the new base document 834. In the tool-based document generated environment, there are many known reasons why new content is introduced into a next generation. In this example, content 1108 from the tool input 844 from the previous iteration remains, and new content 1106 from the tool input is introduced into the new base document 834. Further, content change 1112 is introduced by the tool 842 into the new base document and the new base document is saved 854. It is not important whether the tool or the tool input introduced (or required) change into the new document, nor is the type of change significant to this discussion. Of course, while the tool 842 generates the new document, it is possible that a user may introduce change or help configure the new base document through a user interface (e.g., a GUI). The new base document is next used in a merge process.

Figure 12:
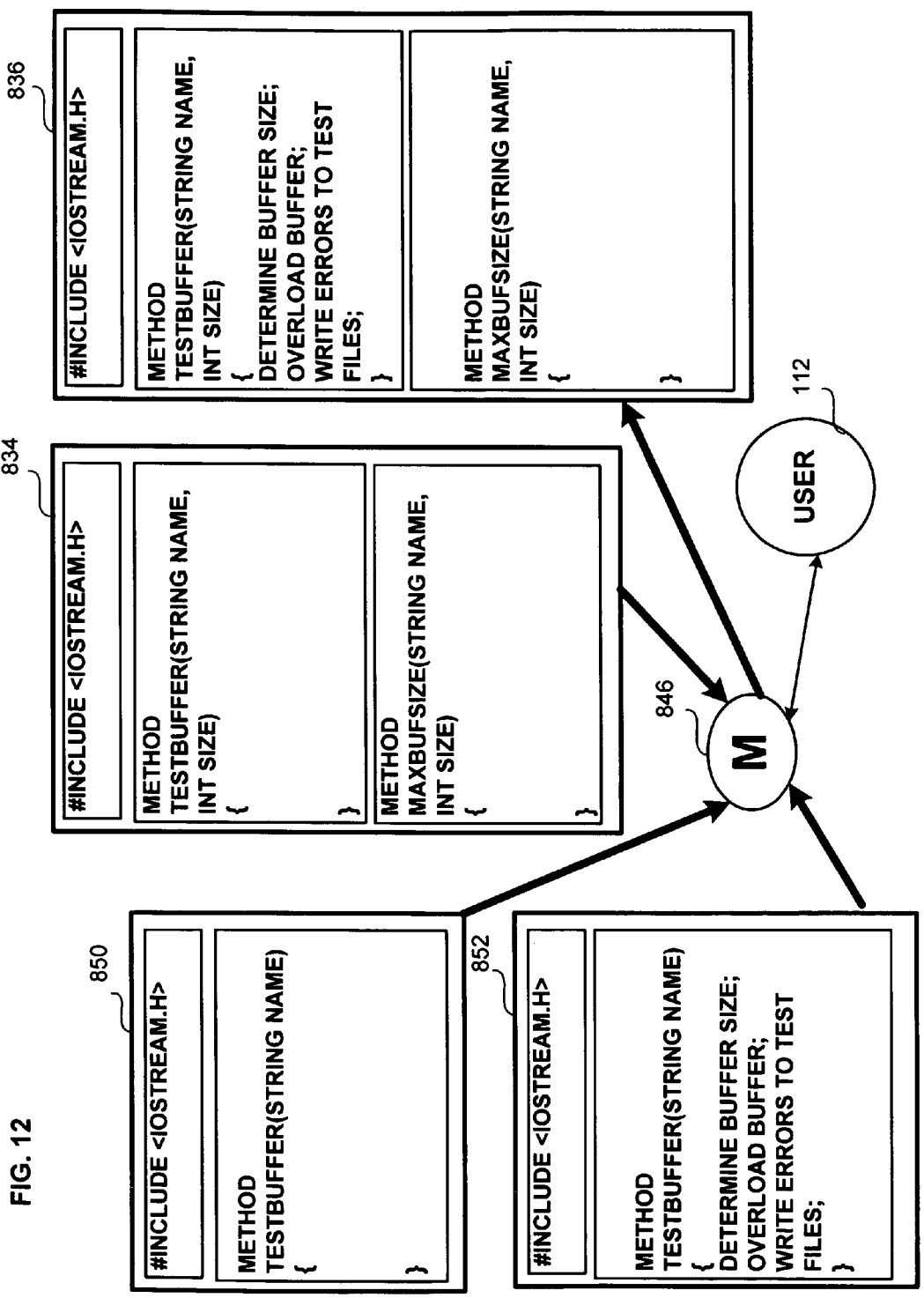
FIG. 12 is a diagram of a system for an iterative tool-based document merge system and method.

As shown in FIG. 12, the new base document 834 is used as input to the three-file-merge process. The base document from the previous iteration 850, serves as the BASE for the three file merge, and the edited document 852 from the previous iteration and the new base document 834 are evaluated by the merge process for change (i.e., NEW-1 (852), and NEW-2 (834)). During the merge process, if the merge finds conflicting changes in the two NEW documents 852, 834, the user 112 is prompted to resolve the conflict in an editor. This is an editor used to resolve merge conflicts, as opposed to the editor 848 used for user edits. Of course, the conflict resolution editor may be implemented with the same or similar editor functionality.

Figure 13:
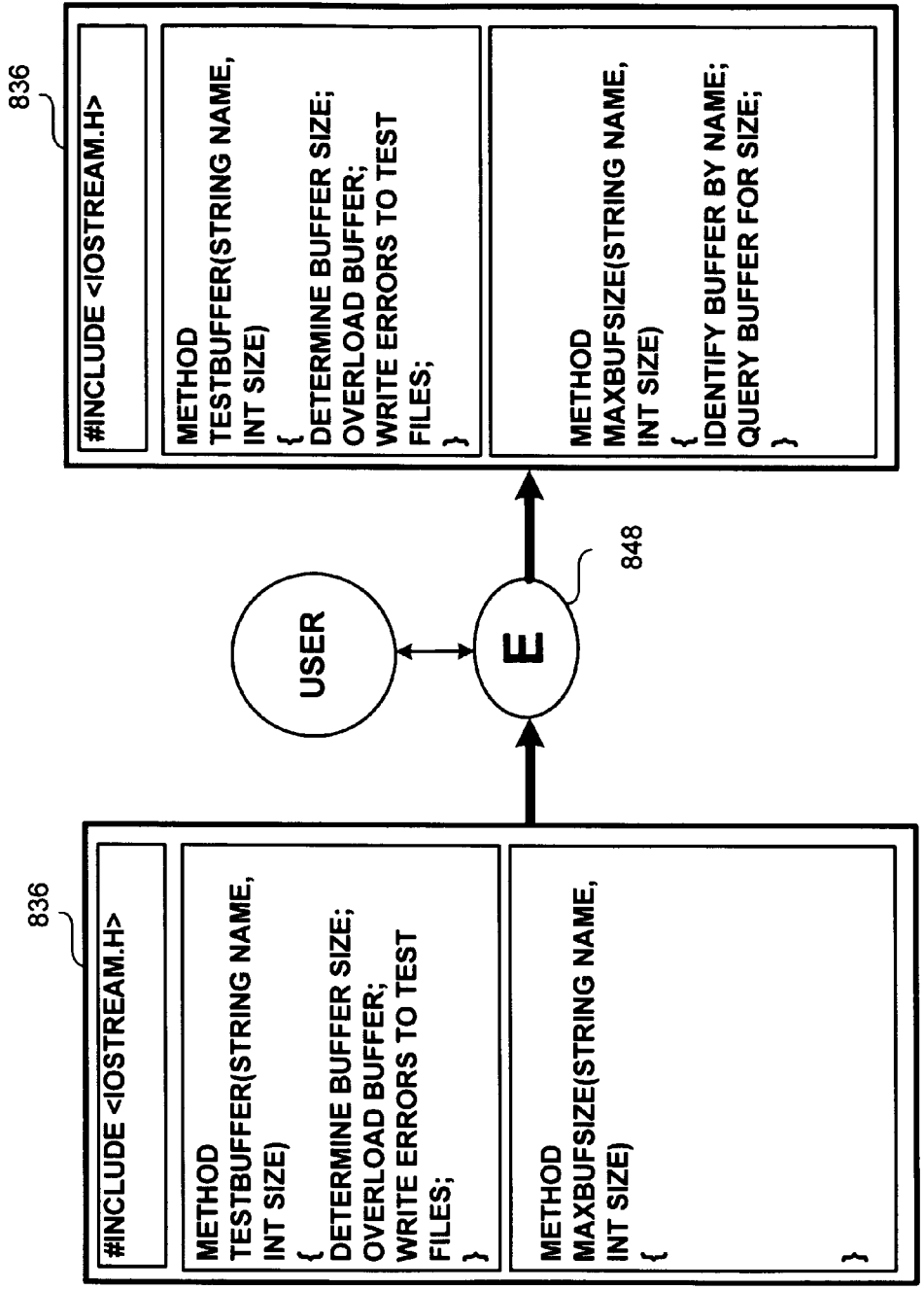
FIG. 13 is a diagram of a system and method for editing a merged document.

As shown in FIG. 13, if further changes are required, a user interacts with an editor 848, and edits the resulting merged document 836. Once edits are complete, the edit document is saved 836.

Figure 14:
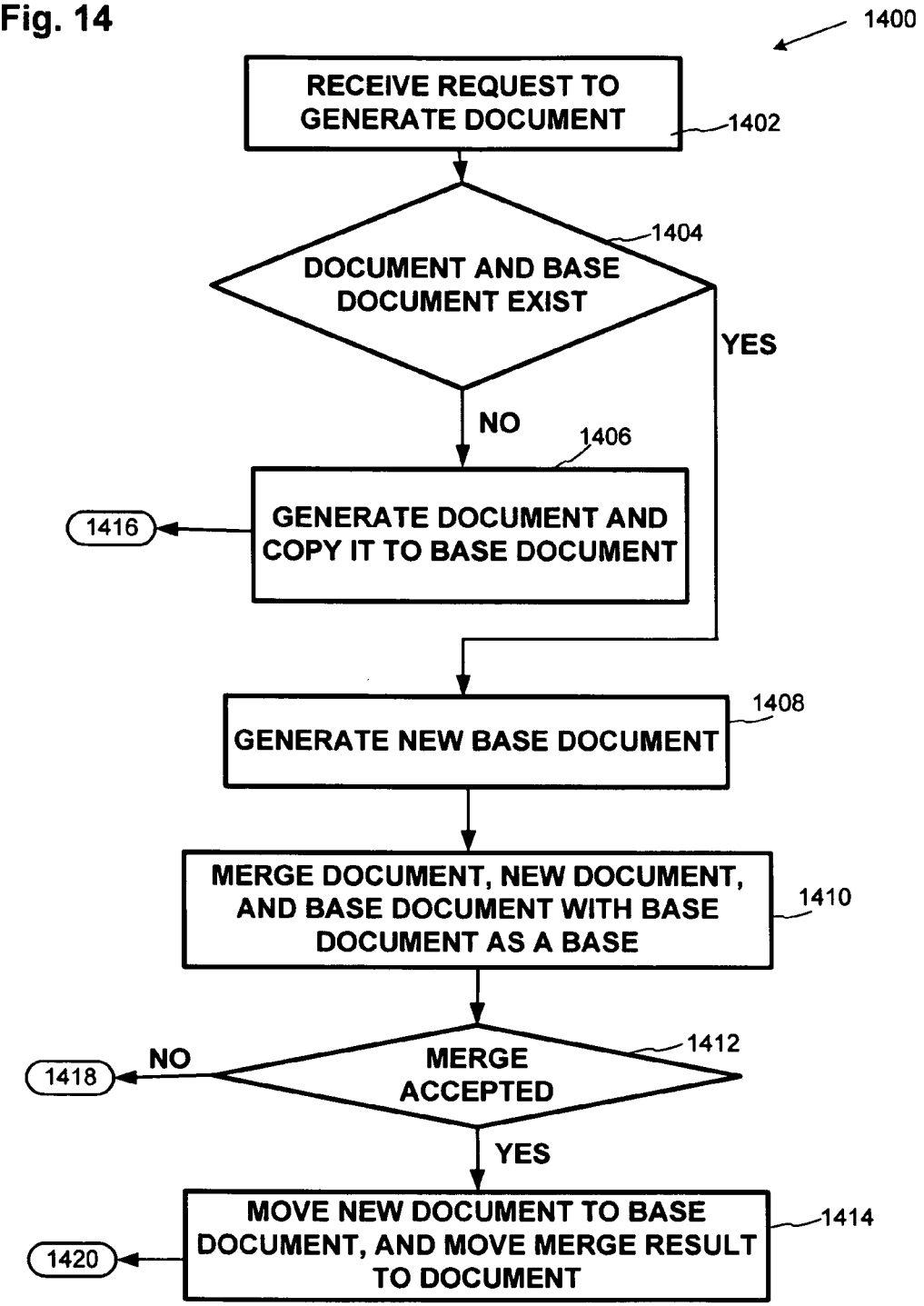
FIG. 14 is a flow chart of a method for tool or tool input based document change management.

FIG. 14 is a flow chart 1400 showing a method of iterative document creation. Using an input device, a user indicates a desire to generate a document. The tool receives this request 1402. If a document and base document do not both exist from a prior iteration 1404, then a document is generated and a copy of the generated document is saved as a base document 1406. Once the document and base document are generated, they will be available later 1416, if needed iteratively.

If the document and the base document do both exist 1404, then a new base document is generated. The new base document is then used in a three-file merge process 1410. The three-file merge process 1410 receives three files as input and outputs a fourth file. The three input files are the document, the base document, and the new base document, with the base document used as the base for the merge 1410.

If the merge is accepted 1412, then the new document is moved to the base document, and the merge result replaces the document 1414. The moved documents become the document and base document if needed later iteratively 1420.

If the merge is not accepted, then the document remains the document, and the base document remains the base document, and both will remain if needed iteratively 1418.

Figure 15:
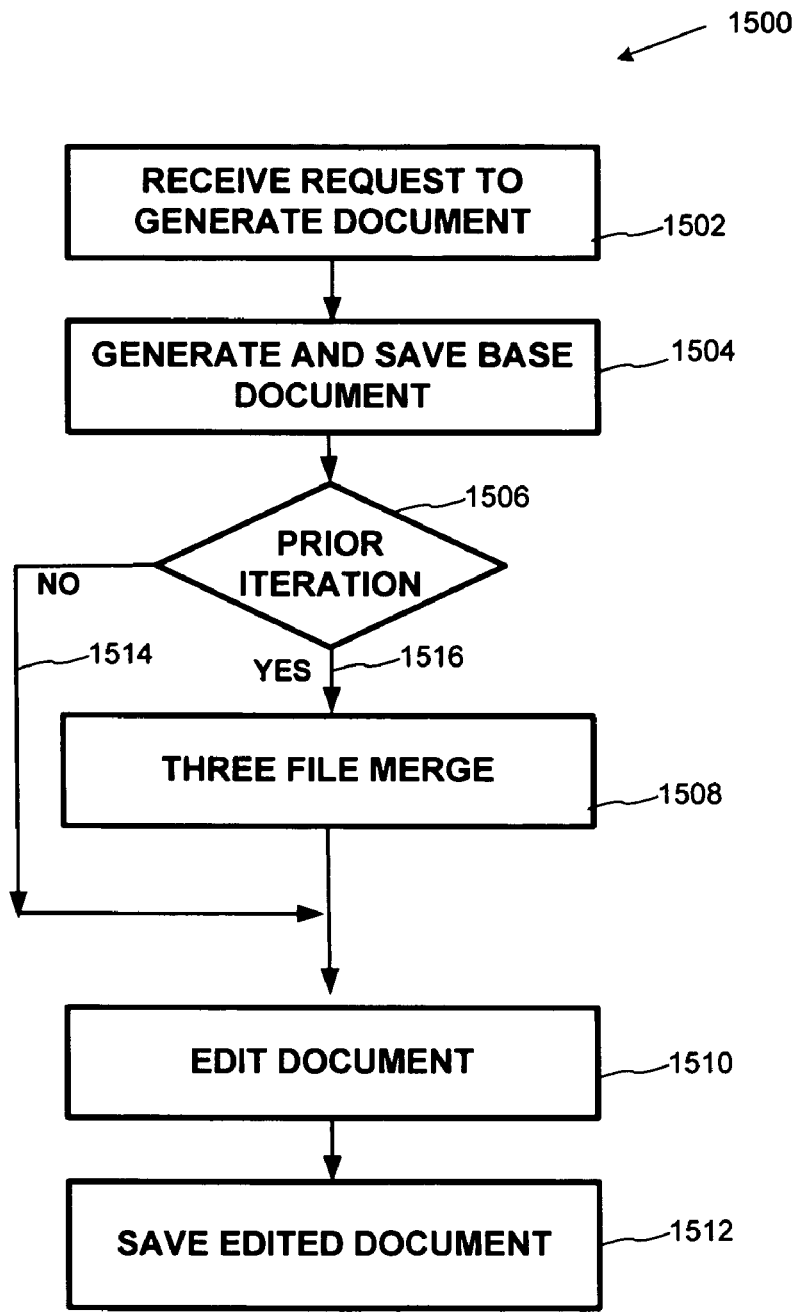
FIG. 15 is a flow chart of a method for tool input or tool based document change management.

FIG. 15 is a flow chart 1500 showing a method of iterative document creation. Using an input device, a user indicates a desire to generate a document. The tool 1502 receives this input, and the tool, using tool input, generates and saves a base document 1504. Optionally, while the base document is being created, the tool may generate one or more graphical user interfaces, that a user interacts with in order to configure the base document. For example, the user may need to select a template(s) (i.e. tool input), and indicate what content should be included from the template(s) in the base document. Further, the user may need to provide additional information specific to this document generation request. This information includes changes that are specific to this base document. For example, if the document generation request is to create a shell for a source code program, the specific information could be the name of a method, or a method parameter to insert in the base document, or class libraries needed to support the program. In this optional case, the base document is generated and saved according to the user configurations 1504.

After the base document is generated and saved, if no prior version of the requested document exists 1514, then this is the first iteration 1506 for this document generation. In this case, when no prior document exists 1514, a user is given the opportunity to edit 1510 a copy of the base document, and the edited copy is saved as the edited document 1512.

After the base document is generated and saved, if a prior version 1506 of the requested document exists 1516, then a three-file-merge is performed 1508. The three file merge takes three files as input, and outputs a fourth file. The three-file-merge takes as input a saved base document from the prior iteration, a saved user edited document from the prior iteration, and the base document 1504 created during this iteration. The output is the merge of all three input files. While the merge occurs, the base document from the prior iteration is used as the merge base, and new content found in the other two input files is added to the merge base. When a conflict appears in changes made to the other two input files, a user is presented with an editor showing the conflict, so it can be resolved. After the merge is complete, the merged document can be edited by the user, if necessary.

In this case, when there is a prior version, the merged file is edited by the user 1510 and saved as the edited document 1512.

Figure 16:
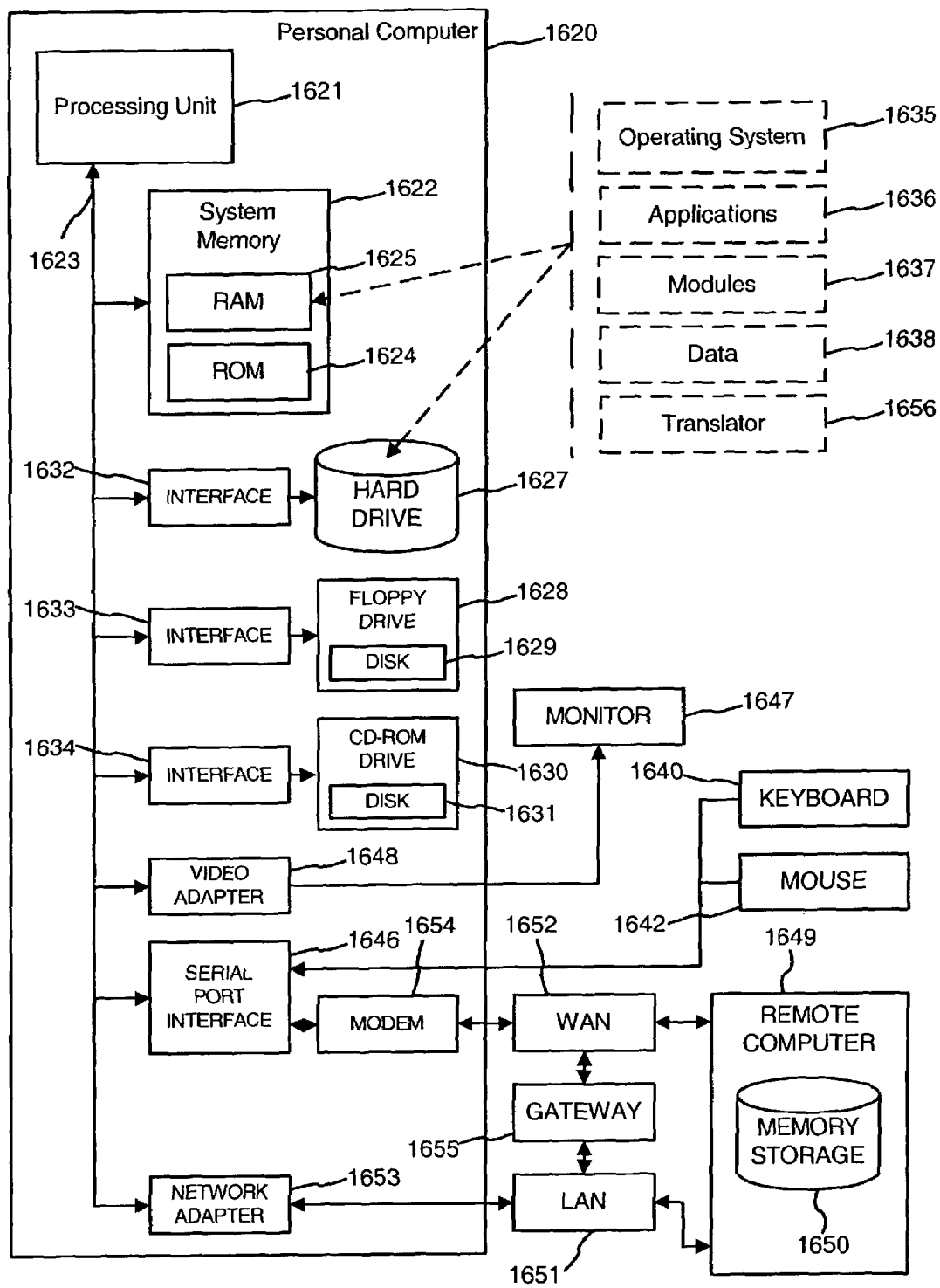
FIG. 16 is a block diagram of a computer system that may be used to implement a method, apparatus, and system embodying tool-based iterative document management.

FIG. 16 and the following discussion are intended to provide a brief, general description of a suitable computing environment for an implementation. While the invention will be described in the general context of computer-executable instructions of a computer program that runs on a computer and/or network device, those skilled in the art will recognize that the invention also may be implemented in combination with other program modules. Generally, program modules include routines, programs, components, data structures, etc. that perform particular tasks or implement particular abstract data types. Moreover, those skilled in the arts will appreciate that the invention may be practiced with other computer system configurations, including multiprocessor systems, microprocessor-based electronics, minicomputers, mainframe computers, network appliances, wireless devices, and the like. The extensions can be practiced in networked computing environments, or on stand-alone computers.

With reference to FIG. 16, an exemplary system for implementation includes a conventional computer 1620 (such as personal computers, laptops, servers, mainframes, and other variety computers) includes a processing unit 1621, a system memory 1622, and a system bus 1623 that couples various system components including the system memory to the processing unit 1621. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 1621.

The system bus may be any of several types of bus structure including a memory bus or memory controller, a peripheral bus, and a local bus using any of a variety of conventional bus architectures such as PCI, VESA, AGP, Microchannel, ISA and EISA, to name a few. The system memory includes read only memory (ROM) 1624 and random access memory (RAM) 1625. A basic input/output system (BIOS), containing the basic routines that help to transfer information between elements within the computer 1620, such as during start-up, is stored in ROM 1624.

The computer 1620 further includes a hard disk drive 1627, a magnetic disk drive 1628, e.g., to read from or write to a removable disk 1629, and an optical disk drive 1630, e.g., for reading a CD-ROM disk 1631 or to read from or write to other optical media. The hard disk drive 1627, magnetic disk drive 1628, and optical disk drive 1630 are connected to the system bus 1623 by a hard disk drive interface 1632, a magnetic disk drive interface 1633, and an optical drive interface 1634, respectively. The drives and their associated computer-readable media provide nonvolatile storage of data, data structures, computer-executable instructions, etc. for the computer 1620. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 1625, including an operating system 1635, one or more application programs 1636, other program modules 1637, and program data 1638; in addition to an implementation 1656.

A user may enter commands and information into the computer 1620 through a keyboard 1640 and pointing device, such as a mouse 1642. These and other input devices are often connected to the processing unit 1621 through a serial port interface 1646 that is coupled to the system bus, but may be connected by other interfaces, such as a parallel port, game port or a universal serial bus (USB). A monitor 1647 or other type of display device is also connected to the system bus 1623 via an interface, such as a video adapter 1648. In addition to the monitor, computers typically include other peripheral output devices (not shown), such as speakers and printers.

The computer 1620 operates in a networked environment using logical connections to one or more remote computers, such as a remote computer 1649. The remote computer 1649 may be a server, a router, a peer device or other common network node, and typically includes many or all of the elements described relative to the computer 1620, although only a memory storage device 1650 has been illustrated. The logical connections depicted include a local area network (LAN) 1651 and a wide area network (WAN) 1652. Such networking environments are commonplace in offices, enterprise-wide computer networks, intranets and the Internet.

When used in a LAN networking environment, the computer 1620 is connected to the local network 1651 through a network interface or adapter 1653. When used in a WAN networking environment, the computer 1620 typically includes a modem 1654 or other means for establishing communications (e.g., via the LAN 1651 and a gateway or proxy server 1655) over the wide area network 1652, such as the Internet. The modem 1654, which may be internal or external, is connected to the system bus 1623 via the serial port interface 1646. In a networked environment, program modules depicted relative to the computer 1620, or portions thereof, may be stored in the remote memory storage device. It will be appreciated that the network connections shown are exemplary and other means of establishing a communications link between the computers may be used.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A method for iterative tool-based document generation, comprising:
    receiving a request to generate a document;
    if a prior base document comprising content automatically created by a wizard tool does not exist or a user document comprising user edits does not exist,
        generating a base document comprising content automatically created by a wizard tool and copying it to become a user document; and
    if both the prior base document comprising content automatically created by a wizard tool and the user document comprising user edits exist,
        generating a new base document comprising content automatically created by a wizard tool,
        generating a merge document using a three file merge of the generated new base document, the prior base document, and the user document, using the prior base document as the base of the merge, and
        if the merge is accepted,
            moving the merged document to become the user document, and
            moving the generated new base document to replace the prior base document, and
        if the merge is not accepted,
            the prior base document and the user document remain the same;
    wherein the generated new base document is a newly generated base document not derived from a saved copy of the prior base document.

2. The method of claim 1 further comprising receiving edits to the merged document moved to become the user document.

3. The method of claim 1 wherein the differences between the newly generated base document and the prior base document are automated changes made by a wizard tool.

4. The method of claim 1 wherein the newly generated base document is generated from a new version of the wizard tool that generated the prior base document, and the merge document is a three file merge output from a merge tool, which received as input, the newly generated base document, the prior base document, and the user document, with the prior base document as the base of the merge.

5. A method for iterative document generation, comprising:
    receiving a request to generate a document;
    generating and saving a new base document for a present iteration;

obtaining a prior iteration's base document, and an edited version of the prior iteration's base document; and creating a merged document for the present iteration comprising a three file merge of the new base document, the prior iteration's base document, and the edited version of the prior iteration's base document, using the prior iteration's base document as base for the merge;

wherein the three file merge includes two base documents comprising the new base document and the prior iteration's base document, and only a single document in the three file merge includes edits made to a base document, the single document comprising the edited version of the prior iteration's base document and wherein the prior iteration's base document and the new base document are generated with different versions of a tool.

6. The method of claim 5 further comprising receiving edits to the merged document, and saving the edited merged document as an edited document for the present iteration.

7. The method of claim 6 wherein a wizard program tool is used to generate the new base document for the present iteration, a merge program is used for creating the merged document, and an editor program is used to receive the edits and save the edited document.

8. The method of claim 5 wherein the request to generate a document comprises a request to open the edited version of the prior iteration's base document.

9. The method of claim 5 wherein generating the new base document for the present iteration further comprises presenting configuration options to a user in a graphical user interface.

10. The method of claim 5 wherein a prior version of a template was used in creating the prior iteration's base document.

11. The method of claim 5 wherein executable code generating the new base document for the present iteration, has been changed since generating the prior iteration's base document.

12. The method of claim 5 wherein the prior iteration was the first iteration.

13. A computer system for managing change during iterative tool-based document generation, the system comprising:

a central processing unit transferring data and instructions from memory via a bus;

computer executable program components for execution by the central processing unit including, a wizard component for creating and saving automated content comprising base documents, an editor component for receiving user edits to base documents after base documents are created by the wizard component, and a merge component for merging three documents to create a merged document, the three documents comprising a new base document created by the wizard component during a present iteration, a prior iteration's base document created by the wizard component during the prior iteration, and a prior iteration's edited base document comprising edits made to the prior iteration's base document by the editor component.

14. The system of claim 13 further comprising, the editor component for receiving edits to the merged document and saving the edited merged document as an edited document;

the wizard component for creating and saving automated content to a second new base document; and the merge component for merging the new base document, the second new base document, and the edited document to create a new merged document.

15. The system of claim 13 wherein the wizard component for creating and saving the new base document further comprises presenting a graphical user interface and receiving document configuration inputs through an input device.

16. The system of claim 13 wherein a prior version of the wizard component was used in creating the prior iteration's base document.

17. The system of claim 13 wherein an executable instruction in the wizard component for creating and saving the new base document, has been changed since generating the prior iteration's base document.

18. A computer readable medium comprising computer executable instructions for iterative tool-based document change management, the instructions comprising:

generating and saving a new base document for a present iteration, the new base document comprising automatic wizard generated content;

obtaining a prior iteration's base document comprising automatic wizard generated content, and obtaining a prior iteration's edited base document comprising the prior iteration's base document with user edits;

creating a merged document for the present iteration comprising three-file merging the prior iteration's base document, the prior iteration's edited base document, and the present iteration's new base document; and receiving user edits to the merged document, and saving the edited merged document as the present iteration's edited document;

wherein the new base document is not created by altering the obtained prior base document.

19. The computer readable medium of claim 18 wherein the new base document comprising automatic wizard generated content comprises content which was not present in the prior iteration's base document.

20. The computer readable medium of claim 18 wherein the computer readable instructions that generated the new base document have been changed since the prior iteration's base document was created.

21. The computer readable medium of claim 18 wherein the instructions for generating the new base document, creating the merged document, and receiving edits, are part of a same computer program.

22. The computer readable medium of claim 18 wherein the present iteration is a third iteration.

* * * * *